US009771850B2

(12) United States Patent
Henry et al.

(10) Patent No.: US 9,771,850 B2
(45) Date of Patent: *Sep. 26, 2017

(54) SYSTEMS AND METHODS FOR CONTROL OF ENGINE NOX EMISSIONS USING LIQUID AND DRY REDUCTANT SOURCES

(71) Applicant: Cummins Emission Solutions Inc., Columbus, IN (US)

(72) Inventors: Cary Henry, Helotes, TX (US); Steven J. Kolhouse, Columbus, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/230,988

(22) Filed: Aug. 8, 2016

(65) Prior Publication Data

US 2016/0341089 A1    Nov. 24, 2016

Related U.S. Application Data

(63) Continuation of application No. 14/064,591, filed on Oct. 28, 2013, now Pat. No. 9,429,060.

(51) Int. Cl.
*F01N 3/00* (2006.01)
*F01N 3/10* (2006.01)
(Continued)

(52) U.S. Cl.
CPC ......... *F01N 3/208* (2013.01); *B01D 53/9495* (2013.01); *F01N 3/021* (2013.01);
(Continued)

(58) Field of Classification Search
CPC ........ F01N 2610/00–2610/06; F01N 2610/10; F01N 2610/1406; F01N 2610/102;
(Continued)

(56) References Cited

U.S. PATENT DOCUMENTS 5,628,186 A    5/1997    Schmelz
5,809,775 A    9/1998    Tarabulski et al.
(Continued)

FOREIGN PATENT DOCUMENTS

EP    1 236 499    9/2002
EP    2 426 327    3/2012
(Continued)

OTHER PUBLICATIONS

Communication issued by the European Patent Office for European Patent Application No. 14190284.1, dated Nov. 4, 2016, 5 pages.
(Continued)

*Primary Examiner* — Phutthiwat Wongwian
*Assistant Examiner* — Diem Tran
(74) *Attorney, Agent, or Firm* — Foley & Lardner LLP

(57) ABSTRACT

Reductant delivery systems are disclosed that include a dry reductant source and a liquid reductant source which are operable to selectively provide gaseous reductant and liquid reductant to an exhaust aftertreatment system for treatment and reduction of NOx emissions. The gaseous reductant is provided to the exhaust aftertreatment system for treatment of NOx emissions under a first temperature condition associated with the exhaust system and the liquid reductant for treatment of NOx emissions under a second temperature condition associated with the exhaust system.

20 Claims, 2 Drawing Sheets

(51) Int. Cl.
*F01N 3/02* (2006.01)
*F01N 3/20* (2006.01)
*B01D 53/94* (2006.01)
*F01N 3/035* (2006.01)
*F01N 3/021* (2006.01)
*F01N 3/28* (2006.01)

(52) U.S. Cl.
CPC .............. *F01N 3/035* (2013.01); *F01N 3/105* (2013.01); *F01N 3/2896* (2013.01); *F01N 2560/026* (2013.01); *F01N 2560/06* (2013.01); *F01N 2570/14* (2013.01); *F01N 2570/145* (2013.01); *F01N 2590/08* (2013.01); *F01N 2610/02* (2013.01); *F01N 2610/06* (2013.01); *F01N 2610/10* (2013.01); *F01N 2610/1406* (2013.01); *F01N 2900/1404* (2013.01); *F01N 2900/1602* (2013.01); *Y02C 20/10* (2013.01); *Y02T 10/24* (2013.01)

(58) Field of Classification Search
CPC .......... F01N 3/021; F01N 3/035; F01N 3/105; F01N 3/208; F01N 3/2896; F01N 3/0871; F01N 3/206; F01N 3/2066; F01N 2900/1404; F01N 2900/1602; F01N 2560/06; F01N 2560/026; F01N 2570/145; F01N 2570/14; F01N 2590/08; Y02T 10/24
See application file for complete search history.

(56) References Cited

U.S. PATENT DOCUMENTS

| | | |
|---|---|---|
| 5,827,490 A | 10/1998 | Jones |
| 6,119,448 A | 9/2000 | Emmerling et al. |
| 6,403,046 B1 | 6/2002 | Spokoyny |
| 6,427,439 B1 | 8/2002 | Xu et al. |
| 7,485,272 B2 | 2/2009 | Driscoll et al. |
| 7,613,561 B1 | 11/2009 | Stewart et al. |
| 7,805,929 B2 | 10/2010 | Driscoll |
| 7,954,311 B2* | 6/2011 | Shaikh .................. F01N 3/2066 60/266 |
| 7,964,163 B2 | 6/2011 | Johannessen et al. |
| 8,015,801 B2 | 9/2011 | Oberski et al. |
| 8,096,110 B2 | 1/2012 | Solbrig |
| 8,607,547 B2 | 12/2013 | Tanoura et al. |
| 2003/0188528 A1 | 10/2003 | Tost |
| 2008/0066453 A1 | 3/2008 | Oberski et al. |
| 2013/0255235 A1 | 10/2013 | Hodgson et al. |

FOREIGN PATENT DOCUMENTS

| | | |
|---|---|---|
| WO | WO-2013/036308 | 3/2013 |
| WO | WO-2013/095214 | 6/2013 |

OTHER PUBLICATIONS

Communication pursuant to article 94(3)EPC, issued for European patent application No. 14190284.1 dated Mar. 7, 2016, 7 pages.
The extended European Search Report issued in European Application No. 14190284.1, dated Mar. 17, 2015.

* cited by examiner

SYSTEMS AND METHODS FOR CONTROL OF ENGINE NOX EMISSIONS USING LIQUID AND DRY REDUCTANT SOURCES

CROSS REFERENCE TO RELATED APPLICATIONS

The present application is a Continuation of U.S. patent application Ser. No. 14/064,591, filed Oct. 28, 2013 and the contents of which are incorporated herein by reference in its entirety.

TECHNICAL FIELD

The technical field generally relates to control of engine NOx emissions, and more particularly using both liquid and dry reductant sources to control engine NOx emissions in selective catalytic reduction (SCR) systems.

BACKGROUND

Heavy duty and other diesel engine types utilize a reductant in a diesel exhaust fluid such as urea in the treatment and reduction of NOx levels in the exhaust. The liquid urea is injected into the exhaust stream upstream of the SCR catalyst. However, when exhaust temperatures are low, the effectiveness of liquid urea in the treatment of NOx emissions suffers from drawbacks, such as the formation of urea deposits in the exhaust system. While superheating of the liquid urea can be used during low temperature conditions to obtain gaseous ammonia and reduce deposit formation, these systems are costly and impractical in many applications.

Solid storage media systems have been developed for ammonia storage in reductant delivery systems for selective catalytic reduction (SCR). The solid storage media systems typically provide a dry source of reductant, such as ammonia, stored in the solid storage media that is contained in a cartridge. The ammonia is released from the solid storage media in gaseous form as needed and delivered to an exhaust gas to treat emissions in an SCR aftertreatment system. However, these systems present drawbacks in heavy duty engine and other high volume applications due to the high cost of the cartridges and the need for frequent servicing to change the cartridge.

Therefore, there remains a need for further improvements in the architecture of reductant delivery systems, and in the control of reductant delivery systems to reduce NOx emissions in low temperature operating conditions, that are practical for heavy duty engine applications among others, while reducing cost and complexity. The present invention meets these and other needs according to the following described embodiments.

SUMMARY

Embodiments includes unique reductant delivery systems that include a dry reductant source and a liquid reductant source which are operable to selectively provide gaseous reductant and liquid reductant, respectively, to an exhaust aftertreatment system for treatment and reduction of NOx emissions. Other embodiments include unique methods, systems, and apparatus to provide gaseous reductant from a dry reductant source to an exhaust aftertreatment system for treatment of NOx emissions under a first temperature condition associated with the exhaust system and to provide liquid reductant from a liquid reductant source for treatment of NOx emissions under a second temperature condition associated with the exhaust system. In one embodiment, the temperature condition is a liquid reductant temperature threshold. The exhaust aftertreatment system can include an SCR catalyst that is connected to receive exhaust gas from an internal combustion engine and that is operable with the reductant to reduce NOx emissions.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
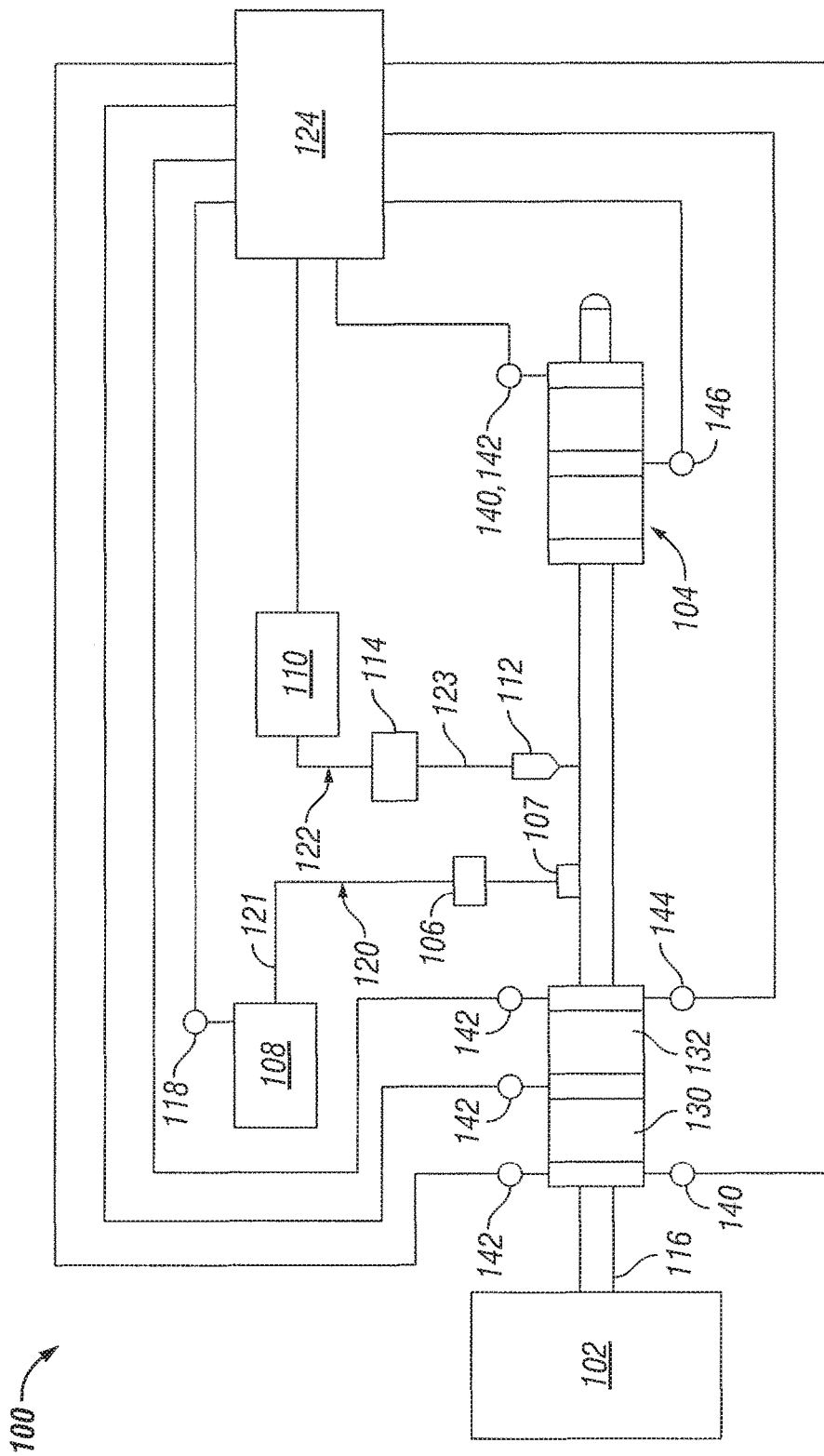
FIG. 1 is a schematic diagram of one embodiment system for providing reductant from dry and liquid reductant sources to an internal combustion engine exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 for control of engine NOx emissions using a gaseous reductant and a liquid reductant. The gaseous reductant is stored in a dry solid storage media that releases the reductant in gaseous form when heated. The gaseous reductant is provided via a metered flow to the exhaust system upstream of the SCR catalyst under a first set of temperature conditions associated with the exhaust system. The liquid reductant is stored in a liquid medium such as diesel exhaust fluid or urea in a storage tank or the like and provided by controlled injection of the liquid medium into the exhaust stream upstream of the SCR catalyst under second set of temperature conditions associated with the exhaust system. As used herein, an SCR catalyst includes any suitable NOx conversion catalyst. In addition, the temperature condition of the exhaust stream can be any one or combination of, for example, an exhaust gas temperature, an SCR catalyst temperature, an estimated catalyst or wall temperature at the location of liquid urea dosing, or temperature of any component in the exhaust or aftertreatment system. Furthermore, the temperature condition can be determined by physical measurements or estimated temperatures determined virtually or by algorithm.

The system 100 includes an internal combustion engine 102 operable to produce a flow of an exhaust gas stream into an exhaust system that includes exhaust flow path 116 and other components. In one specific embodiment, engine 102 is a diesel engine. The exhaust gas output by engine 102 includes NOx and other components which are to be reduced before outlet to the environment using an exhaust aftertreatment system in exhaust flow path 116 and the dry and liquid reductant sources connected to the exhaust flow path 116. System 100 is illustrated schematically and may be included with a car, truck, semi, bus, boat, recreational vehicle, construction equipment, locomotive, or other type of vehicle. Other embodiments include an engine provided in non-vehicular applications such as a generator set.

The system 100 includes an aftertreatment system with SCR catalyst 104 in exhaust flow path 116 that reduces at least a portion of the amount of NOx from the exhaust stream. System 100 also includes a gaseous reductant source 108 that stores an amount of a dry NOx reductant such as, for example, ammonia ($NH_3$), in a solid storage media. In one embodiment, the solid storage media may be any material involving adsorption or absorption of molecular ammonia in the solid, or a solid chemical compound which can be manipulated in order to produce gaseous ammonia. In one particular embodiment, the solid storage media includes metal ammine salts. The NOx reductant stored in the solid storage media housed in reductant source 108 may be ammonia or any other reductant understood in the art capable of being stored and selectively released from a solid storage media. Reductant source 108 may include a cartridge or housing providing one or more storage units having one or more compartments for storing ammonia in solid storage media.

System 100 also includes a first reductant delivery system 120 that receives gaseous reductant released from the solid storage media in reductant source 108, and provides the gaseous reductant to the exhaust flow path 116 at a position upstream of the NOx conversion catalyst 104. Gaseous reductant passes through a reductant supply line 121 from reductant source 108 to a metering device 106 and from metering device 106 to a mixer 107 connected in fluid communication with exhaust flow path 116. The mixer 107 is located upstream of the SCR catalyst 104. Mixer 107 is supplied with gaseous reductant from reductant source 108 and is operable to mix reductant gas with exhaust gas in exhaust flow path 116. Reductant delivery system 120 may include sensors, control valves, heating sources, coolant lines, and other devices useful in the release of gaseous reductant from the solid storage media and in the delivery of the gaseous reductant to the exhaust flow path 116 in the desired amount, rate and timing.

In one embodiment, gaseous reductant source 108 is operatively coupled with at least one engine coolant feed line and an engine coolant return line that provide a source of heat that heats the solid storage media stored in reductant source 108 to release the stored reductant in gaseous form. Other embodiments contemplate other means for heating the solid storage media in reductant source 108, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into supply line 121 by thermal desorption. The consumption rate of the released $NH_3$ gas is measured by metering device 106 as it is mixed into exhaust flow path 116 upstream of the SCR catalyst 104. Pressure/temperature sensor 118 provide signals corresponding to the pressure of the gas released into supply line 121 and signals corresponding to the temperature of the solid storage media in reductant source 108 for control of the release of the reductant gas. The temperature and pressure signals may be provided continuously or discretely, and by a single device or separate devices.

System 100 also includes a liquid reductant source 110 that stores an amount of liquid NOx reductant such as, for example, ammonia ($NH_3$), in a liquid storage medium. In one embodiment, the liquid storage medium is diesel exhaust fluid stored in a tank. Other liquid reductant storage mediums such as urea are also contemplated.

System 100 also includes a second reductant delivery system 122 that receives liquid reductant in the liquid storage medium released from the liquid reductant source 110, and provides the liquid reductant to the exhaust flow path 116 at a position upstream of the SCR catalyst 104. Liquid reductant passes through a reductant supply line 123 from reductant source 110 to a dosing device 114 and from dosing device 114 to an injector 112 connected in fluid communication with exhaust flow path 116. The injector 112 is located upstream of the SCR catalyst 104. Injector 112 is supplied with liquid reductant from reductant source 110 and is operable to inject or otherwise mix liquid reductant into exhaust flow path 116 for mixing with exhaust gas. Reductant delivery system 122 may include sensors, control valves, heating sources, coolant lines, and other devices useful in the delivery of liquid reductant from the storage source 110 to the exhaust flow path 116 in the desired amount, rate and timing.

In one embodiment, the exhaust aftertreatment system may include an oxidation catalyst 130 which is in fluid communication with exhaust flow path 116 and is operable to catalyze oxidation of one or more compounds in the exhaust gas flowing through exhaust flow path 116, for example, oxidation of unburned hydrocarbons or oxidation of NO to $NO_2$. Oxidation catalyst 130 can be any of various flow-through oxidation catalysts. Generally, oxidation catalyst 130 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 130 may sufficiently reduce the hydrocarbon and CO concentrations in the exhaust to meet the requisite emissions standards.

The exhaust aftertreatment system may also include a diesel particulate filter 132 in fluid communication with exhaust flow path 116 and operable to reduce the level of particulates in exhaust flowing through exhaust flow path 116. In an exemplary embodiment diesel particulate filter 132 is a catalyzed soot filter. The diesel particulate filter 132 can be any of various particulate filters known in the art configured to reduce particulate matter concentrations, e.g., soot and ash, in the exhaust gas to meet requisite emission standards. The diesel particulate filter 132 includes a filter substrate that captures soot and other particulate matter generated by the engine 102. The system 100 periodically regenerates diesel particulate filter 132 to remove particulate matter that has accumulated on the diesel particulate filter over time. For example, diesel particulate filter 132 can be regenerated by increasing the temperature of the exhaust gas above a threshold temperature corresponding with combustion of the particulate matter.

In certain implementations, the system 100 includes an exhaust gas recirculation (EGR) line (not shown) configured to allow a portion of the exhaust gas generated by the engine to recirculate back into the engine for altering the combustion properties of the engine 102. The exhaust aftertreatment system may further include a hydrocarbon (HC) injector (not shown) which is supplied with HC from an HC reservoir and is operationally coupled to the exhaust stream at a position upstream of SCR catalyst 104. Other embodiments of system 100 may include engine 102 having a common rail fuel system capable of injecting a post injection fuel where at least a portion of the post injection fuel does not combust to provide HC in the exhaust stream. Embodiments are also contemplated without a HC injector. Certain embodiments may also include an ammonia oxidation AMOX catalyst (not shown) at a position downstream of the SCR catalyst 104, which is operable to catalyze the reaction of $NH_3$ which slips past the SCR catalyst 104.

Reductant gas or liquid injected into exhaust flow path 116 is provided to the SCR catalyst 104 which is in flow communication with exhaust flow path 116 and is operable to catalyze the reduction of $NO_x$. SCR catalyst 104 can be any of various catalysts known in the art. For example, in some implementations, the SCR catalyst with a zeolite based catalyst, such as a Cu-Zeolite or a Fe-Zeolite catalyst, or a vanadium based catalyst.

Exhaust flow path 116, as illustrated schematically in FIG. 1, may be provided in a variety of physical configurations. In an exemplary embodiment an exhaust flow path proceeds from the output of a turbocharger (not shown) of engine 102 through a conduit to a structure containing oxidation catalyst 130 and diesel particulate filter 132, through a second conduit to a structure containing the SCR catalyst 104 and through another conduit which outlets to the ambient environment. In other embodiments, the components of the exhaust gas after-treatment system can be positioned in any of various arrangements, and the system can include other components or fewer components. Generally, exhaust gas treated in the exhaust gas after-treatment system and released into the atmosphere consequently contains significantly fewer pollutants, such as diesel particulate matter, NOx, hydrocarbons, and carbon monoxide, than untreated exhaust gas.

The system 100 further includes a controller 124 that performs certain operations for controlling reductant delivery to exhaust flow path 116 from first reductant source 108 and second reductant source 110 in response to a temperature condition associated with the exhaust system. As used herein, a temperature condition associated with the exhaust system can include a temperature condition of SCR catalyst 104, a temperature condition of exhaust gas at the exhaust manifold or the connection of engine 102 with exhaust flow path 116, a downstream temperature condition of the exhaust gas in exhaust flow path 116, or a temperature condition of a component of the exhaust system. The temperature condition can also be a combination, average, weighted average, of these temperature conditions or other suitable determination of a temperature condition associated with the exhaust system determined from temperature sensors, derived from temperature sensors, or determined from operating conditions.

In one embodiment, controller 124 is configured to determine the temperature condition of the exhaust system is in a low temperature range and control first reductant source 108 to provide gaseous reductant to the exhaust flow path 116. Controller 124 is also configured to determine the temperature condition of the exhaust system is above the low temperature range and control second reductant source 110 to provide liquid reductant to the exhaust flow path 116. The controller 124 may include modules structured to functionally execute operations to determine the temperature condition and control reductant delivery in response to the temperature condition. In certain embodiments, the controller 124 includes an exhaust system temperature condition module that is configured to determine the temperature condition associated with the exhaust system and a reductant source selection module configured to select reductant source 108 or reductant source 110 in response to the temperature condition.

Controller 124 is connected to various sensors to receive or determine operating parameters of system 100 and to provide certain control outputs in response to the operating parameters according to programmed instructions. In the illustrated embodiment, controller 124 is connected to NOx sensors 140 and temperature sensors 142 to receive inputs regarding the operation of the exhaust system and the performance, such as NOx conversion efficiency, of the aftertreatment system. Pressure sensor or differential pressure sensor 144 provides signals regarding the pressure associated with particulate filter 132, and ammonia sensor 146 provides signals regarding a mid-bed ammonia amount of SCR catalyst 104 for feedback control of reductant delivery along with NOx sensors 140. Additional sensors associated with the exhaust system can be provided and are not shown, such as additional NOx and/or temperature sensors at other locations, other ammonia sensors, and flow sensors.

Controller 124 may include one or more modules as discussed above structured to functionally execute the operations described herein. The description herein, including modules, emphasizes the structural independence of the aspects of the controller 124, and illustrates one grouping of operations and responsibilities of the controller 124. Other groupings that execute similar overall operations are understood within the scope of the present application. Modules may be implemented in hardware and/or software on computer readable medium, and modules may be distributed across various hardware or software components.

Controller 124 forms a portion of a processing subsystem including one or more computing devices having memory as well as a number of inputs and outputs for interfacing with various sensors and subsystems of system 100. Controller 124 can include an electronic circuit comprised of one or more components, including digital circuitry, analog circuitry, or both. Controller 124 may be a single device or a distributed device. Controller 124 may include one or more control algorithms defined by operating logic in the form of software instructions, hardware instructions, firmware instructions, dedicated hardware, or the like.

In one form, controller 124 is of a programmable microcontroller solid-state integrated circuit type that includes memory and one or more central processing units. The memory of controller 124 includes of one or more components and can be of any of volatile or nonvolatile, solid-state, optical media, magnetic media, combinations of these, or other types of memory. Controller 124 can include signal conditioners, signal format converters (such as analog-to-digital and digital-to-analog converters), limiters, clamps, filters, and the like as needed to perform various control and regulation operations described herein. Controller 124, in an exemplary embodiment, may be a type of controller sometimes referred to as an electronic or engine control module (ECM), electronic or engine control unit (ECU) or the like, that is directed to the regulation and control of engine operation. Alternatively, controller 124 may be dedicated to the control of just the operations described herein or to a subset of controlled aspects of system 100.

Figure 2:
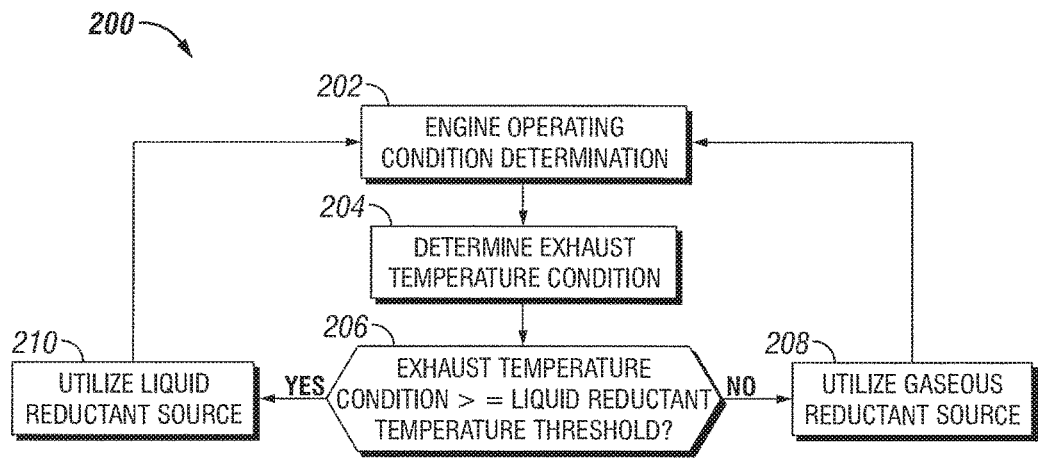
FIG. 2 is a flow diagram of one embodiment of a procedure for selectively providing liquid reductant from a liquid reductant source and gaseous reductant from a dry reductant source to an exhaust aftertreatment system.

An exemplary procedure to be performed by controller 124 for determining a temperature condition and reductant source selection for delivery of reductant to exhaust flow path is described in FIG. 2. In FIG. 2, procedure 200 includes an operation 202 to determine an operating condition of engine 102. Engine operating condition determinations can include determining operating conditions that produce exhaust gas to respond to a torque request or to satisfy a torque demand, that correspond to an engine start-up request or start-up condition, that correspond to an engine shut-down request or condition, or that correspond to an eminent engine shut-down condition.

Procedure 200 further includes an operation 204 to determine a temperature condition associated with the exhaust system. As discussed above, the temperature condition can correspond to a temperature of the exhaust gas at one or more locations, a temperature of SCR catalyst 104, a temperature condition of a component of the exhaust system, or a combination of these. The temperature condition can be determined from a single input from a temperature sensor or combination of sensors, an average or other determination based on a number of inputs from one or more temperature sensors, an input from a virtual temperature sensor, or a derived or calculated value from operating conditions.

Procedure 200 continues at conditional 206 to determine if the temperature condition associated with the exhaust system is greater than or equal to a liquid reductant threshold temperature. The liquid reductant threshold temperature can be, for example, a temperature at or above which liquid reductant is effectively hydrolyzed in the exhaust gas to prevent or reduce deposit formation in the exhaust system. Other liquid reductant threshold temperatures are also contemplated and not precluded.

If conditional 206 is negative, procedure 200 continues at operation 208 and provides the gaseous reductant from gaseous reductant source 108 to the exhaust system. If conditional 206 is positive, procedure 200 continues at operation 210 and provides liquid reductant from liquid reductant source 110 to the exhaust system.

Providing gaseous reductant when the temperature condition is less than the liquid reductant temperature threshold enables treatment of NOx emissions in low temperature operating conditions while avoiding or minimizing the formation of reductant deposits typically formed by dosing of liquid reductant in low temperature conditions. Since the first reductant source 108 including the solid storage media is used only during certain operating conditions, the stored amount of reductant in the solid storage media can be significantly less than what would be required if the solid storage media stored the entire reductant supply for all operating conditions. Thus, in one embodiment, first reductant source 108 includes replaceable cartridges of solid storage media with stored dry reductant that are removed and replaced with another cartridge when empty.

In other embodiment of procedure 200, the engine operating condition determination 202 and/or exhaust temperature condition determination 204 can include a reductant storage capacity determination of the SCR catalyst 104 and an eminent engine shut-down condition determination. If storage capacity on SCR catalyst 104 is available, an eminent engine shut-down condition determination can result in an operation to dose liquid reductant from second reductant source 110 to store reductant on SCR catalyst 104 for NOx reduction in a subsequent engine cold start while the catalyst temperature is still above the liquid reductant dosing threshold.

In another embodiment, the engine operating condition determination 202 and/or exhaust temperature condition determination 204 can include a reductant storage capacity determination of the SCR catalyst 104 and an engine shut-down condition determination. If storage capacity on SCR catalyst 104 is available, an engine shut-down condition determination can result in an operation to provide gaseous reductant from first reductant source 108 to store reductant on SCR catalyst 104 for NOx reduction in a subsequent engine cold start while the catalyst temperature is below the liquid reductant dosing threshold.

In another embodiment, the engine operating condition determination 202 and/or exhaust temperature condition determination 204 can include a reductant storage capacity determination of the SCR catalyst 104 and an engine start-up condition determination. The start-up condition can be determined based on, for example, ambient conditions, a door switch activation, a key-switch activation, a key-on delay timing, a time-of-day, a day of week, a preprogrammed schedule, an operator input, or other start-up indicator. If storage capacity on SCR catalyst 104 is available, an engine start-up determination can result in an operation to provide gaseous reductant from first reductant source 108 to store reductant on SCR catalyst 104 for NOx reduction in the subsequent engine start-up while the catalyst temperature is below the liquid reductant dosing threshold. In one embodiment, gaseous reductant from first reductant source 108 is provided upon engine start-up following a pre-determined amount of key-off time when ambient temperature is below a pre-determined threshold.

In still other embodiments, the controller 124 is configured to use only one of reductant sources 108, 110 when the other reductant source is determined to be unavailable due to, for example, being empty or malfunctioning. In one embodiment, an indicator is provided to the driver when one of the reductant sources is empty or malfunctioning, but operation of the vehicle is maintained by providing reductant exclusively from the other reductant source until service is completed. In yet other embodiments, controller 124 is configured to use dry reductant source 108 exclusively in response to an estimated urea deposit build-up or accumulation in the aftertreatment system exceeding a predetermined limit, or in response to a determination of a freezing condition associated with liquid reductant source 110 or any of its components connecting it the exhaust system. The determination of urea deposit thresholds or limits and frozen or potentially frozen/stuck/blocked conditions can be performed by any known technique. The determination of the freezing condition can be a determination of a cold weather condition likely to cause a freezing condition, of an actual frozen condition, or of a blocked condition associated with a temperature of the liquid reductant or a blockage preventing or reducing flow of the liquid reductant. In further embodiments, reductant from both first reductant source 108 and second reductant source 110 is used simultaneously under certain operating conditions, such as during a transition from supplying reductant only from the dry reductant source to supplying reductant only from the liquid reductant source.

The schematic flow diagrams and related descriptions above provide illustrative embodiments of performing procedures for selective gaseous reductant and liquid reductant delivery in response to a temperature condition of the exhaust system. Operations illustrated are understood to be exemplary only, and operations may be combined or divided, and added or removed, as well as re-ordered in whole or part, unless stated explicitly to the contrary herein. The operations of the various embodiments can also be combined as a single embodiment. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 3:
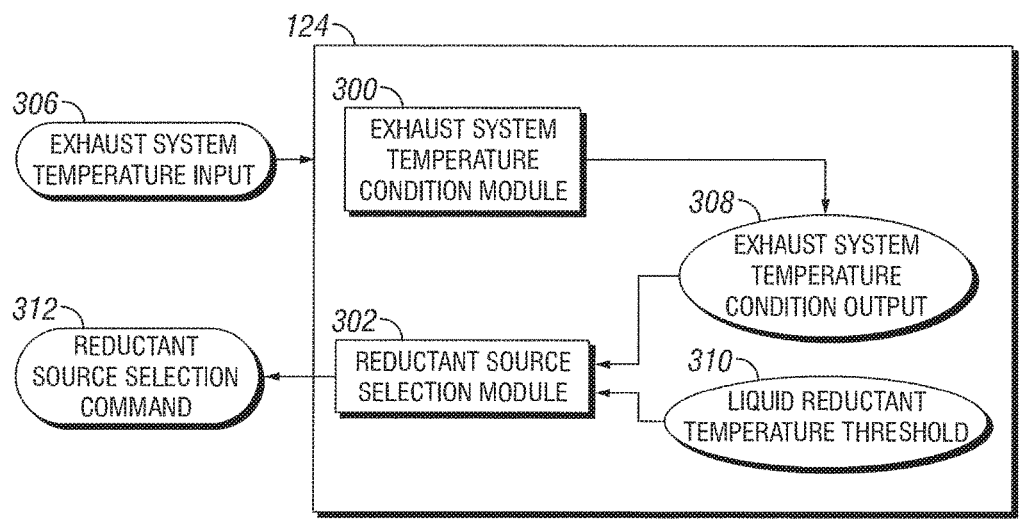
FIG. 3 is a schematic diagram of an apparatus for selectively providing reductant to an exhaust aftertreatment system from a dry reductant source and a liquid reductant source.

Referring to FIG. 3, an apparatus including controller 124 includes an exhaust system temperature condition module 300 structured to determine a temperature condition associated with the exhaust system. The controller 124 also includes a reductant source selection module 302 structured to control the selection and dosing of gaseous reductant from the first reductant source 108 and liquid reductant from the liquid reductant source 110 in response to the temperature condition determination.

Exhaust system temperature condition module 300 is structured to receive one or more temperature inputs 306 associated with the exhaust system and provide an exhaust system temperature condition output 308. In one embodiment, the exhaust system temperature condition module 300 is further structured to determine the temperature condition in response to an imminent engine shut-down or completed engine shutdown. In yet a further embodiment, the exhaust system temperature condition module 300 is structured to determine the temperature condition in response to an engine start-up condition.

The reductant source selection module 302 is structured to receive and interpret the temperature condition output 308 and provide a reductant source selection command 312 that controls providing gaseous reductant from the first reductant source 108 if the temperature condition 308 is less than a liquid reductant temperature threshold 310 and providing liquid reductant from the second reductant source 110 if the temperature condition 308 is greater than or equal to the liquid reductant temperature threshold 310. In further embodiments, reductant source selection module 302 is structured to select reductant source 108 or reductant source 110 based on the temperature condition output 308 in response to an eminent engine shut-down condition, an engine shut-down condition, or engine start-up condition based on a reductant storage capacity of SCR catalyst 104. Other embodiments contemplate reductant source selection module 302 is structured to select one of reductant source 108, 110 in response to an empty or malfunction condition of the other reductant source, and to select reductant source 108 in response to a urea deposit condition or a freezing condition associated with second reductant source 110.

As is evident from the figures and text presented above, a variety of embodiments according to the present disclosure are contemplated. Example of the contemplated embodiments are provided in the claims appended hereto, but are not limited to the claims.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
producing via an internal combustion engine an exhaust gas in an exhaust flow path including a selective catalytic reduction (SCR) catalyst and at least one of an oxidation catalyst or a diesel particulate filter;
determining a temperature condition of the exhaust gas; and
selectively providing one of a gaseous reductant released from a dry reductant storage source and a liquid reductant from a liquid reductant source to the exhaust flow path upstream of the SCR catalyst and downstream of the at least one of the oxidation catalyst or the diesel particulate filter in response to the temperature condition of the exhaust gas, wherein the gaseous reductant is provided when the temperature condition of the exhaust gas is in a low temperature operating range and the internal combustion engine is in a post-shutdown condition, and the liquid reductant is provided when the temperature condition of the exhaust gas is above the low temperature operating range and the internal combustion engine is in a pre-shutdown condition.

2. The method of claim 1, wherein determining the temperature condition of the exhaust gas includes determining a temperature of the SCR catalyst.

3. The method of claim 1, wherein the liquid reductant source includes a urea solution in a storage tank.

4. The method of claim 1, wherein the gaseous reductant includes ammonia and the dry reductant source includes a solid storage media.

5. The method of claim 1, wherein the exhaust flow path includes a diesel oxidation catalyst and a diesel particulate filter upstream of the SCR conversion catalyst.

6. The method of claim 1, wherein an upper temperature of the low temperature operating range is a temperature at or above which liquid reductant is effectively hydrolyzed in the exhaust gas to prevent or reduce deposit formation in the exhaust system.

7. The method of claim 1, further comprising:
determining an engine shut-down condition and a reductant storage capacity of the SCR catalyst; and
selectively providing one of the gaseous reductant released from the dry reductant storage source and the liquid reductant from the liquid reductant source to the exhaust flow path upstream of the SCR catalyst in response to the engine shutdown condition and determining the SCR catalyst has the reductant storage capacity.

8. A method, comprising:
producing an exhaust gas in an exhaust flow path including a selective catalytic reduction (SCR) catalyst and at least one of an oxidation catalyst or a diesel particulate filter, wherein producing the exhaust gas includes operating an internal combustion engine;
determining a temperature condition of the exhaust gas;
determining an engine start-up condition; and
selectively providing one of a gaseous reductant released from a dry reductant storage source and a liquid reductant from a liquid reductant source to the exhaust flow path upstream of the SCR catalyst and downstream of the at least one of the oxidation catalyst or the diesel particulate filter in response to the temperature condition of the exhaust gas;

wherein providing the gaseous reductant released from the dry reductant source is in response to the engine start-up condition before operating the internal combustion engine to produce the exhaust gas.

9. The method of claim 8, wherein providing the gaseous reductant from the dry reductant source includes heating the dry reductant source.

10. The method of claim 8, wherein selectively providing one of the gaseous reductant and the liquid reductant includes determining that one of the dry reductant source and liquid reductant source is unavailable and selecting the other of the dry reductant source and the liquid reductant source.

11. A system, comprising:
an internal combustion engine operable to produce an exhaust stream, the exhaust stream including an amount of NOx emitted into an exhaust flow path;
a first reductant source that stores a NOx reductant in a solid storage media and a second reductant source that stores the NOx reductant in a liquid medium;
a selective catalytic reduction (SCR) conversion catalyst and at least one of an oxidation catalyst or a diesel particulate filter in the exhaust flow path, wherein the first reductant source and the second reductant source are each connected to the exhaust flow path upstream of the SCR catalyst and downstream of the at least one of the oxidation catalyst or the diesel particulate filter to provide the NOx reductant to the SCR catalyst; and
a controller connected to one or more sensors associated with the exhaust stream operable to indicate a temperature condition of the exhaust stream, wherein the controller is configured to control the first reductant source to dose the NOx reductant in a gaseous form from the solid storage media into the exhaust stream in response to a first temperature condition of the exhaust stream and the internal combustion engine being in a post-shutdown condition, and the controller is further configured to control the second reductant source to dose the NOx reductant from the liquid medium in a liquid form in response to a second temperature condition of the exhaust stream and the internal combustion engine being in a pre-shutdown condition.

12. The system of claim 11, wherein the first reductant source doses the NOx reductant in the gaseous form in response to heating of the solid storage media.

13. The system of claim 11, wherein the first reductant source is connected to the exhaust flow path with a supply line that includes a metering device to provide a measured flow rate of the gaseous reductant to the exhaust flow path.

14. The system of claim 11, wherein the NOx reductant comprises ammonia, the solid storage media comprises metal ammine salts, and the liquid storage medium comprises a urea solution.

15. The system of claim 11, wherein the exhaust flow path includes a diesel oxidation catalyst and a diesel particulate filter upstream from the SCR catalyst.

16. The system of claim 11, wherein the first temperature condition is a low temperature operating range of the SCR catalyst and the second temperature condition is a normal operating temperature range of the SCR catalyst.

17. The system of claim 11, wherein the controller is further configured to control the first reductant source to dose the NOx reductant in a gaseous form from the solid storage media in response the internal combustion engine being in a start-up condition before operating the internal combustion engine to produce the exhaust gas.

18. The system of claim 11, wherein the first reductant source includes a replaceable cartridge containing the solid storage media mounted to a chassis of a vehicle powered by the internal combustion engine and the second reductant source includes a storage tank mounted to the chassis.

19. The system of claim 11, wherein the second temperature condition is a temperature at or above which liquid reductant is effectively hydrolyzed in the exhaust gas to prevent or reduce deposit formation in the exhaust system.

20. An apparatus, comprising:
an electronic controller structured to receive operating parameters from at least one sensor associated with an exhaust system that is connected with a first reductant source for storing a gaseous reductant in a solid storage media and a second reductant source for storing a liquid reductant in a liquid storage medium, wherein the controller includes:
an exhaust system temperature condition module structured to determine a temperature condition associated with the exhaust system and to determine the temperature condition in response to a startup condition of an internal combustion engine connected to the exhaust system; and
a reductant source selection module structured to selectively dose gaseous reductant from the first reductant source and liquid reductant from the liquid reductant source in response to the temperature condition and to provide gaseous reductant from the first reductant source in response to the startup condition before operating the internal combustion engine to produce the exhaust gas,
wherein the exhaust system comprises a selective catalytic reduction (SCR) conversion catalyst and at least one of an oxidation catalyst or a diesel particulate filter in the exhaust flow path, the liquid reductant and the gaseous reductant is selectively dosed upstream of the SCR catalyst and downstream of the at least one of an oxidation catalyst or a diesel particulate filter.

* * * * *